US012756174B2

(12) United States Patent
Dong et al.

(10) Patent No.: US 12,756,174 B2
(45) Date of Patent: Oct. 6, 2026

(54) RECLOSING CONTROL FOR COORDINATING A SOLID-STATE SWITCH AND A CIRCUIT BREAKER

(71) Applicant: ABB Schweiz AG, Baden (CH)

(72) Inventors: Zhou Dong, Raleigh, NC (US); Govind S. Chavan, Garner, NC (US); Harish Suryanarayana, Apex, NC (US); Pietro Cairoli, Cary, NC (US)

(73) Assignee: ABB Schweiz AG, Baden (CH)

( * ) Notice: Subject to any disclaimer, the term of this patent is extended or adjusted under 35 U.S.C. 154(b) by 122 days.

(21) Appl. No.: 18/981,893

(22) Filed: Dec. 16, 2024

(65) Prior Publication Data

US 2026/0171780 A1 Jun. 18, 2026

(51) Int. Cl.
*H02H 3/00* (2006.01)
*H02H 1/00* (2006.01)
*H02H 3/08* (2006.01)

(52) U.S. Cl.
CPC ............ *H02H 3/08* (2013.01); *H02H 1/0007* (2013.01)

(58) Field of Classification Search
CPC . H02H 3/08; H02H 1/0007; H02J 9/04; H02J 9/06; H02J 9/062; H02J 9/068
USPC ............................................... 361/87; 307/87
See application file for complete search history.

(56) References Cited

U.S. PATENT DOCUMENTS

| | | | | |
|---|---|---|---|---|
| 7,459,804 | B2 * | 12/2008 | Marwali | H02J 3/007 307/127 |
| 2019/0181679 | A1 * | 6/2019 | Northway | H02J 13/12 |
| 2024/0030741 | A1 * | 1/2024 | Bose | G01R 19/10 |
| 2024/0396329 | A1 * | 11/2024 | Zeng | H02J 1/08 |

* cited by examiner

*Primary Examiner* — Crystal L Hammond
*Assistant Examiner* — Lucy M Thomas
(74) *Attorney, Agent, or Firm* — Fitch Even Tabin & Flannery LLP

(57) ABSTRACT

A predefined peak current value for a system that includes a transfer switch system, a first power source, a downstream transformer, and a downstream circuit breaker is obtained. A sensed current value for some components of the system are obtained by sensors of the system. A corresponding semiconductor switch assembly of the first power source is instructed to turn off in response to determining a fault in the electrical distribution system using the sensed current value and the predefined peak current value. A reference current is obtained for the downstream circuit breaker. An updated sensed current value is obtained. The corresponding semiconductor switch assembly of the first power source is instructed to turn on based on an integrated value of the updated sensed current value matching an integrated value of the reference current, where turning on and off the switch is repeated until the downstream circuit breaker clears the fault.

20 Claims, 10 Drawing Sheets

500

RECLOSING CONTROL FOR COORDINATING A SOLID-STATE SWITCH AND A CIRCUIT BREAKER

FIELD

The invention relates to a switching arrangement, a system, and a method for load transfer of supply voltage and a reclosing control method for coordinating between a solid-state switch and a circuit breaker (CB) during provisioning of a load.

BACKGROUND

Automatic Transfer Switches (ATS) are widely used in alternating current (AC) power distribution systems to provide reliable power to critical applications by switching between a preferred power source and a backup source. The typical operation of an ATS involves electromechanical switches, which take time to transition between on and off states, leading to transfer delays ranging from tens to hundreds of milliseconds. While these delays are tolerable in non-critical applications, they can be problematic in sensitive environments such as hospitals or industrial systems. A faster solution, the Static Transfer Switch (STS), which uses semiconductor switches like silicon-controlled rectifiers (SCRs), offers much quicker transfer times (under 20 milliseconds).

To improve efficiency, WO2018157915A1 proposes combining a fast mechanical commutating switch (FCS) in parallel with semiconductors in the STS. This hybrid solution reduces conduction losses, but it remains costly due to the expensive FCS components and the need for semiconductors to handle short-circuit currents. While this system is more efficient than traditional STS setups, it is not cost-effective compared to ATS systems.

SUMMARY

An embodiment of the present disclosure provides a transfer switch system for controlling current to a downstream circuit breaker of an electrical distribution system, the transfer switch system including: a first power source and a second power source, one or more sensors configured to detect an electrical measurement associated with powering a load between the first power source, the second power source, a downstream transformer, and the downstream circuit breaker, one or more semiconductor switch assemblies, the first power source and the second power source associated with a different semiconductor switch assembly of the one or more semiconductor switch assemblies, and a controller configured to: obtain a predefined peak current value, obtain a sensed current value associated with the first power source, the downstream circuit breaker, and the downstream transformer based on electrical measurements obtained by the one or more sensors, instruct a corresponding semiconductor switch assembly of the first power source to turn off in response to determining a fault in the electrical distribution system, the fault determined by comparing the sensed current value to the predefined peak current value, obtain a reference current that indicates a trip threshold value for the downstream circuit breaker, obtain, subsequent to the corresponding semiconductor switch assembly of the first power source being turned off, an updated sensed current value associated with the first power source, the downstream circuit breaker, and the downstream transformer from the one or more sensors, and instruct the corresponding semiconductor switch assembly of the first power source to turn on based on an integrated value of the updated sensed current value matching an integrated value of the reference current, wherein the instructions to turn off and turn on the corresponding semiconductor switch assembly is repeated until the downstream circuit breaker clears the fault or until a preset maximum duration is reached.

In an embodiment of the transfer switch system, the one or more semiconductor switch assemblies comprise at least one of silicon controlled rectifiers (SCRs), insulate gate bipolar transistors (IGBTs), metal-oxide-semiconductors (MOSFETs), integrated gate-commutated thyristors (IGCTs), and gate turn-off thyristors (GTOs).

In an embodiment of the transfer switch system, each switch of the one or more semiconductor switch assemblies is associated with a different phase of an A/C current of the load, and wherein the controller is further configured to obtain the predefined peak current value for each phase of the A/C current, the sensed current value for each phase of the A/C current, and wherein instructing the corresponding semiconductor switch assembly of the first power source to turn on and turn off includes switching a corresponding switch of the corresponding semiconductor switch assembly for a certain phase of the A/C current.

In an embodiment of the transfer switch system, the predefined peak current value and the reference current are user specified, or wherein the reference current is based on a digital signal provided by the downstream circuit breaker indicating the trip threshold.

In an embodiment of the transfer switch system, the reference current is based on characteristics of the downstream circuit breaker.

In an embodiment of the transfer switch system, the controller further includes: a comparator circuit, a multiplier component, an integrator circuit with a reset function, and a flip-flop circuit.

In an embodiment of the transfer switch system, the integrated value of the updated sensed current value and the integrated value of the reference current are determined by providing the updated sensed current value and the reference current to the multiplier component and the integrator circuit as input.

In an embodiment of the transfer switch system, the matching of the integrated value of the updated sensed current value, or a square of the updated sensed current value, or a function of the updated current sense value to the integrated value of the reference current, or a square of the reference current, or a function of the reference current is implemented by the comparator circuit.

In an embodiment of the transfer switch system, the instructions to turn off and turn on the corresponding semiconductor switch assembly are further based at least in part on the flip-flop circuit receiving an output from the comparator circuit.

In an embodiment of the transfer switch system, the controller is further configured to initiate a connection between the second power source and the load in response to a transfer command by instructing each switch of the corresponding semiconductor switch assembly of the first power source to turn off in response to a fault flag being cleared by the controller, wherein the fault flag is cleared in response to the downstream circuit breaker clearing the fault, and instructing each switch of a corresponding semiconductor switch assembly of the second power source to turn on.

In an embodiment of the transfer switch system, initiating the connection between the second power source and the load is prohibited by the controller based on at least one iteration of the instructing of the corresponding semiconductor switch assembly of the first power source to turn off and turn on, or based on the fault flag being set by the controller, wherein the fault flag is set in response to the downstream circuit breaker failing to clear the fault.

Another embodiment of the present disclosure provides a tangible, non-transitory computer-readable medium having instructions thereon which, upon being executed by one or more processors, provide for controlling current to a downstream circuit breaker of an electrical distribution system by execution of the following steps: obtaining a predefined peak current value for the electrical distribution system that includes a transfer switch system, a first power source, a second power source, a downstream transformer, and a downstream circuit breaker, obtaining a sensed current value associated with the first power source, the downstream circuit breaker, and the downstream transformer based on electrical measurements obtained by one or more sensors of the electrical distribution system, instructing a corresponding semiconductor switch assembly of the first power source to turn off in response to determining a fault in the electrical distribution system, the fault determined by comparing the sensed current value to the predefined peak current value, obtaining a reference current that indicates a trip threshold value for the downstream circuit breaker, obtaining, subsequent to the corresponding semiconductor switch assembly of the first power source being turned off, an updated sensed current value associated with the first power source, the downstream circuit breaker, and the downstream transformer from the one or more sensors, and instructing the corresponding semiconductor switch assembly of the first power source to turn on based on an integrated value of the updated sensed current value matching an integrated value of the reference current, wherein the instructions to turn off and turn on the corresponding semiconductor switch assembly is repeated until the downstream circuit breaker clears the fault or until a preset maximum duration is reached.

In an embodiment of the tangible, non-transitory computer-readable medium, each switch of the one or more semiconductor switch assemblies is associated with a different phase of an A/C current of the load, and wherein the instructions, upon being executed by the one or more processors, are further configured to execute the following steps: obtaining the predefined peak current value for each phase of the A/C current, the sensed current value for each phase of the A/C current, and wherein instructing the corresponding semiconductor switch assembly of the first power source to turn on and turn off includes switching a corresponding switch of the corresponding semiconductor switch assembly for a certain phase of the A/C current.

In an embodiment of the tangible, non-transitory computer-readable medium, the predefined peak current value and the reference current are user specified, or wherein the reference current is based on a digital signal provided by the downstream circuit breaker indicating the trip threshold.

In an embodiment of the tangible, non-transitory computer-readable medium, the reference current is based on characteristics of the downstream circuit breaker.

In an embodiment of the tangible, non-transitory computer-readable medium, the electrical distribution system further comprises a microcontroller unit (MCU).

In an embodiment of the tangible, non-transitory computer-readable medium, the integrated value of the updated sensed current value and the integrated value of the reference current are determined by providing the updated sensed current value and the reference current to the MCU as input.

In an embodiment of the tangible, non-transitory computer-readable medium, the matching of the integrated value of the updated sensed current value to the integrated value of the reference current is implemented by the MCU.

In an embodiment of the tangible, non-transitory computer-readable medium, the instructions to turn off and turn on the corresponding semiconductor switch assembly are further based at least in part on receiving an output from the MCU.

Another embodiment of the present disclosure provides a solid-state circuit breaker for controlling current to a downstream mechanical circuit breaker of an electrical distribution system, the solid-state circuit breaker including: one or more sensors configured to detect electrical measurements associated with powering a load between a power source and the downstream mechanical circuit breaker, one or more semiconductor devices, and a controller configured to: obtain a predefined peak current value, obtain a sensed current value associated with the power source and the downstream mechanical circuit breaker based on the electrical measurements obtained by the one or more sensors, instruct a corresponding semiconductor device of the solid-state circuit breaker to turn off in response to determining a fault in the electrical distribution system, the fault determined by comparing the sensed current value to the predefined peak current value, obtain a reference current that indicates a trip threshold value for the downstream mechanical circuit breaker, obtain, subsequent to the corresponding semiconductor device of the solid-state circuit breaker being turned off, an updated sensed current value associated with the power source and the downstream mechanical circuit breaker from the one or more sensors, and instruct the corresponding semiconductor device of the solid-state circuit breaker to turn on based on an integrated value of the updated sensed current value matching an integrated value of the reference current, wherein the instructions to turn off and turn on the corresponding semiconductor device are repeated until the downstream circuit breaker clears the fault or until a preset maximum duration is reached.

BRIEF DESCRIPTION OF DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Figure 1:
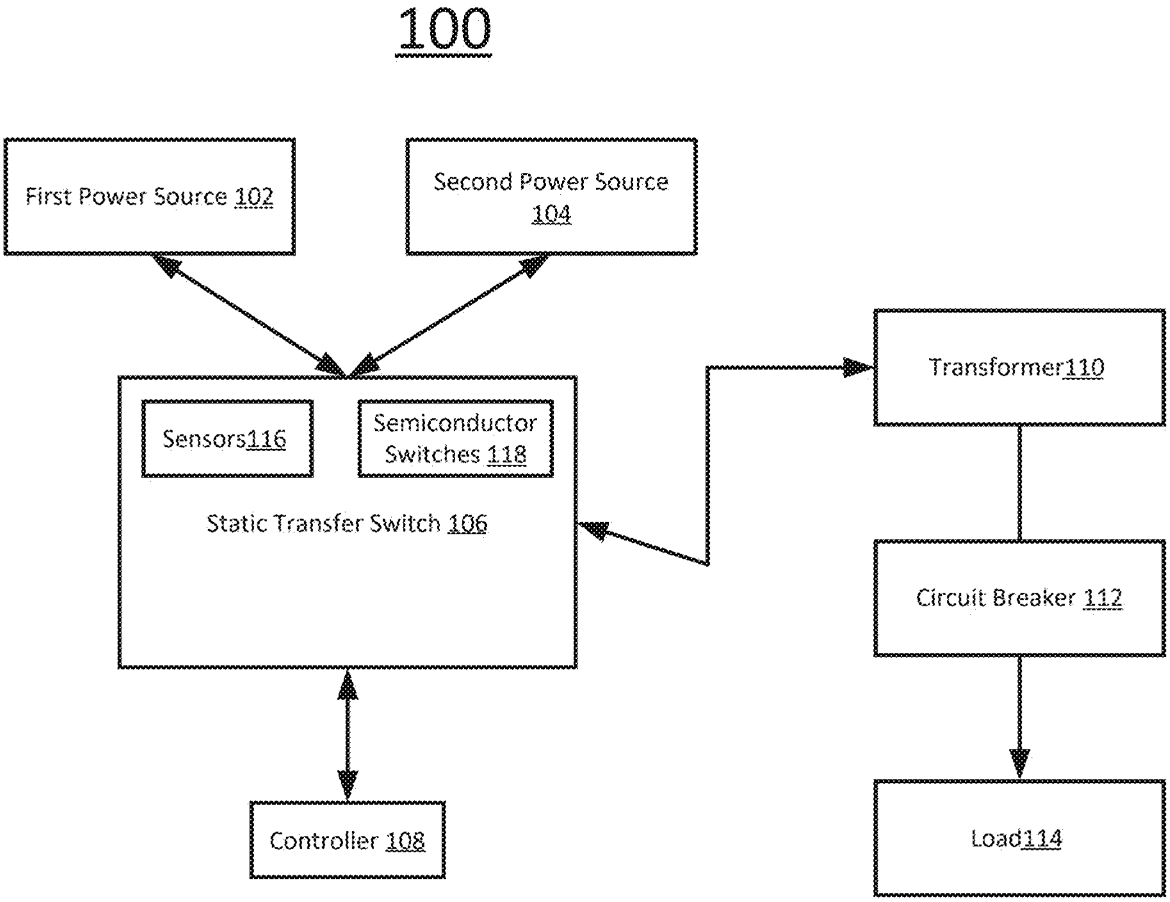
FIG. 1 depicts a simplified block diagram depicting an exemplary STS environment using a reclosing function in accordance with one or more examples of the present disclosure.

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Embodiments of the present disclosure provide for features for controlling current flowing through downstream circuit breakers in an electrical distribution system by implementing a control method at the STS or solid-state switch to coordinate the STS or solid-state switch with a downstream circuit breaker thereby improving overall reliability of the electrical distribution system. The reclosing function features described in the present disclosure enable a switch, such as a SiC MOSFET, in an STS to turn on and turn off at certain times to control the current flowing through the electrical distribution system to allow a downstream circuit breaker enough time to clear a fault thereby controlling the current flowing through the downstream circuit breaker(s). The reclosing function implemented by the STS of the present disclosure provides enough time for a downstream circuit breaker to trip and clear a fault before the STS transfers from a preferred power source (first power source) to an alternative power source (second power source) to increase system reliability. In embodiments, the reclosing functions implemented by a controller of an STS or solid-state switch may accurately determine turn on and turn off times for associated switches so that enough current and time is provided for a downstream circuit breaker to trip based on a time-current characteristic (TCC) curve while a SiC main switch of the STS or solid-state switch is maintained within its safety operating region. The determining of the appropriate timing for turn on and turn off signals/instructions must be adaptively determined based on characteristics of the sensed current of the load, characteristics of the downstream circuit breaker, where a fault is located, and the inductance of the fault current. In some examples, the characteristics of the downstream circuit breaker include time-current characteristics that are associated with the downstream circuit breaker. In some embodiments, the characteristics of the downstream circuit breaker are user configurable or user specified and may depend on the setup of the associated system. Although some of the description below includes details for a control method of an STS for coordinating with a downstream circuit breaker, embodiments disclosed herein and the description provided for this scenario, are also applicable for coordinating between a solid-state switch and a downstream circuit breaker, as described in more detail with reference to FIG. 7.

As will be discussed below in further detail, an STS transfers power delivery from a first power source to a second power source in a rapid fashion in scenarios where there is a problem or issue with the first power source, and vice versa. The amount of time taken for this transfer to occur is a critical metric of an STS. Typically, as depicted in FIG. 1, there is a circuit breaker and transformer that is downstream of the STS. The transformer inrush current during a transfer executed by the STS, which will be referred to herein as transfer inrush current, must be limited to prevent any upstream breakers of the electric distribution system from tripping. STSs primarily function to seamlessly transfer power between two independent sources without any interruption to the connected load. The STS may continuously monitor the quality of both sources and instantly switch between the sources if it detects anomalies such as voltage fluctuations, frequency deviations, or faults. As depicted in FIG. 1, a downstream circuit breaker is normally connected between the STS and the load. An STS that implements a SiC MOSFET as a main power switch has controllable turn off and turn on capability as well as modular scalability. The controllable turn off and turn on capability of these types of STSs enables more advanced control algorithms to be implemented and allow coordination between the STS and a downstream circuit breaker resulting in less transfer time between the power sources connected to the STS.

As used herein "reclosing" refers to an automatic re-energization of a circuit after it has been tripped due to a fault. In an STS environment implementing the reclosing function features described herein, this means that the STS can stick to a first power source while the reclosing function provides enough time and enough energy to a downstream circuit breaker to trip and clear a detected fault. This allows the circuit breaker to isolate and clear the fault and thereby prevent unnecessary shutdowns and transfers between the power sources by the STS. In an example scenario, assume a fault occurs downstream in an electrical distribution system, such as a short circuit or overload, an STS implementing the features of the present disclosure can open switches connected to a first power source to isolate or interrupt the fault. However, before transferring to the second power source, by the STS, the STS needs to ensure the downstream circuit breaker trips and clears the fault. Otherwise, the fault would remain in the system despite transferring to a different power source by the STS. The control method features described herein can also prevent loss of power to all associated downstream circuit breakers in a scenario where an STS or solid-state switch is associated with multiple downstream circuit breakers. For example, a single STS may supply power to multiple downstream loads, where each load is protected by a circuit breaker. Absent the control method of the present disclosure if the STS trips in response to a fault all the downstream loads would lose power. However, if the STS implements a reclosing function via the features described herein it can allow an appropriate downstream circuit breaker to trip and clear the fault therefore avoiding an interruption to the other associated loads. The reclosing function features described herein enable an STS to turn off a switch at a preset peak current and calculate a root mean square (RMS) value of a present current to determine a next time instant to turn on the switch again. The reclosing control is implemented for the STS by controlling the RMS current flowing in each switching cycle. The RMS current is controlled by the STS and associated switches by turning off when the current reaches a preset peak current and turning on again when an integrated RMS current is the same as a preset RMS current. In embodiments, the RMS current can be detected directly from the current or indirectly through thermal means or other approaches. Although the example above and other examples or exemplary embodiments may describe the STS being connected to a first power source when a fault occurs, the embodiments disclosed herein are not limited to such a scenario. The reclosing control features described herein can be applied on both a first power source and a second power source, depending on which power source is being used to provide a load at the time the fault occurs.

FIG. 1 depicts a simplified block diagram depicting an exemplary STS environment 100 using a reclosing function in accordance with one or more examples of the present disclosure. FIG. 1 includes power sources such as a first power source (preferred power source) 102, a second power source (alternative power source) 104, a static transfer switch 106, a controller 108, an optional transformer (downstream transformer) 110, a circuit breaker (downstream circuit breaker) 112, and a load 114. Power sources 102 and 104 may provide power to power one or more loads such as load 114. For example, the first power source 102 may provide power to the load 114. After a certain amount of time or in response to an issue with the first power source 102 (e.g. drop in current or disruption in voltage), the first power source 102 may be disconnected from the load 114, and instead, the second power source 104 may be connected to the load 114. In some examples, the first power source 102 may be a primary source or preferred power source and the second power source 104 may be a backup, a secondary, or alternative power source. In some variations, the first power source 102 and the second power source 104 may be alternating current (AC) power sources that provide alternating current/power to the load 114. In some variations, the first power source 102 and the second power source 104 may be single phase or three phase power sources. In some implementations, the exemplary STS environment 100 can include one or more circuit breakers (downstream circuit breakers) 112. The STS 106 may interact with each of the one or more circuit breakers 112 as a fault occurs downstream of each circuit breaker or when a fault occurs in a given circuit breaker of the one or more circuit breakers 112.

The load 114 may be any type of load that uses power from the power sources 102 and 104 to perform one or more tasks. In some embodiments, the load 114 may accept AC power and/or direct current (DC) power from the power sources 102 and 104 via the transformer 110. The transformer 110 may be a device that transfers electrical energy from one circuit to another circuit (e.g., from the power sources 102 and 104 to the load 114). In some instances, the transformer 110 may convert and/or otherwise alter the current, voltage, and/or power from the power sources 102 and 104 prior to providing the current, voltage, and/or power to the load 114. For instance, the transformer 110 may step up and/or step down the current from the power sources 102 and 104 prior to providing the current to the load 114. Additionally, and/or alternatively, the transformer may convert the current from the power sources 102 (e.g., AC current) to another type of current (e.g., DC current).

The controller 108 is in electrical communication with one or more components of the static transfer switch 106. In some embodiments, the controller 108 is a component or otherwise integrated into the static transfer switch 106. Additionally, and/or alternatively, while not shown, the controller 108 may also be in communication with other components within the environment 100 including the power sources 102 and 104, the transformer 110, the circuit breaker 112, and/or the load 114. For instance, the controller 108 may be in communication with the transformer 110 and/or one or more sensors associated with the transformer 110 to determine the status of the transformer 110. As another example, the controller 108 may be in communication with the circuit breaker 112 and/or one or more sensors associated with the circuit breaker 112 to determine a status of the circuit breaker 112. The controller 108 may be any type of hardware and/or software logic, such as a central processing unit (CPU), RASPBERRY PI processor/logic, processor, and/or logic, that executes computer executable instructions for performing the functions, processes, and/or methods described herein.

The static transfer switch 106 may include one or more sensors 116 and one or more semiconductor switches 118. In some embodiments, the static transfer switch 216 includes mechanical switches which may be any type of physical switch with mechanical moving parts and/or voltage clamping circuits. The controller 108 may use one or more components of the static transfer switch 106 to swiftly switch between powering the load 114 using the first power source 102 and powering the load 114 using the second power source 104, based on measurements obtained from the sensors 116 of the static transfer switch 106. In embodiments, the controller 108 may use one or more components of the static transfer switch 106 to open and close semiconductor switches 118 at determined times to enable the circuit breaker 112 to clear a fault based on measurements (current measurements or electrical measurements) obtained by sensors 116.

The sensors 116 may include current sensors, voltage sensors, and/or other sensors that provide measurements (e.g., current measurements or electrical measurements) to the controller 108. The semiconductor switches 118 may be any type of semiconductor switching devices (e.g., silicon controlled rectifiers (SCRs), solid state switchers, or other semiconductor switches, Gate turn-off (GTO) thyristors, Integrated gate-commutated thyristors (IGCTs), Insulated gate bipolar transistors (IGBTs), Metal-oxide-semiconductor field effect transistors (MOSFETs)) as well as mechanical switches and/or voltage clamping circuits. These semiconductor switches 118 may have forced commutation circuits that allow current interruption at instances other than a zero current crossing. In some embodiments, the semiconductor switch(es) 118 is/are a four-quadrant switch, i.e., it is capable of blocking voltages of both polarities and capable of carrying current in both directions.

The semiconductor switches 118 are configured to swiftly switch between powering the load 114 using the first power source 102 and the second power source 104. For instance, the controller 108 may use the semiconductor switches 118 to switch between powering the load 114 using the first power source 102 to powering the load 114 using the second power source 104, and vice versa.

In some examples, the controller 108 may switch how the load 114 is being powered based on one or more factors. For instance, initially, the load 114 may be powered by the first power source 102. Based on the one or more factors, the controller 108 may switch from powering the load 114 using the first power source 102 to powering the load 114 using the second power source 104. After a certain amount of time has elapsed, the controller 108 may switch back and power the load 114 using the first power source 102. These factors may include, but are not limited to, sudden increase or decrease of voltage (AC) of the first power source 102, sudden increase or decrease of the frequency of the first power source 102, inability by the first power source 102 to provide the necessary power required by load 114, and failure of the first power source 102. In some examples, the controller 108 may be configured to routinely transfer between using the first power source 102 and the second power source 104 for powering the load 114. In such examples, the static transfer switch 106 may switch between the first power source 102 and second power source 104 occasionally and/or periodically at regular intervals of time.

In order to swiftly execute the transfer from the first power source 102 to the second power source 104, the semiconductor switches 118 are connected in parallel between the power sources 102, 104 and the load 114. In some embodiments, the controller 108 may determine that the first power source 102 is unable to supply power to the load 114. For example, the controller 108 may determine a sudden increase or decrease of voltage of the first power source 102, sudden increase or decrease of the frequency of the first power source 102, inability by the first power source 102 to provide the necessary power required by load 114, or failure of the first power source 102. In such cases, the controller 108 may instruct the static transfer switch 106 to disconnect the first power source 102 from the load 114. The static transfer switch 106 may disconnect a mechanical switch from the first power source 102 or, instruct or relay an instruction from the controller 108 to the semiconductor switches 118 to turn off, thereby severing the connection between the first power source 102 and the load 114. The process severing the connection between the first power source 102 and the load 114 may take $t_{on}$ milliseconds to complete.

Once the first power source 102 is disconnected from the load 114, the current from the first power source 102 to the load 114 reduces to zero. When the controller 108, using sensors 116, determines that the current from the first power source 102 to the load 114 is zero or close to zero, the controller 108 instructs the static transfer switch 106 to initiate connections between the second power source 104 and the load 114 by finding where flux bands (estimated fluxes) between the second power source 104 and the first power source 102 match, within a flux band range. Once the semiconductor switches 118 for the second power source 104 are turned on, accounting for all three phases in a three phase AC power system, the connection between the second power source 104 and the load 114 is complete. In embodiments, the static transfer switch 106 may have a set of semiconductor switches 118 associated with the first power source 102 for turning on or off and a set of semiconductor switches 118 associated with the second power source 104 for turning on or off.

In some embodiments, the controller 108 implements a reclosing function as described herein that uses measurements from the sensors 116 to determine accurate turn off and turn on times for the semiconductor switches 118 thereby enabling the circuit breaker 112 to clear a fault in environment 100. By implementing the reclosing function described herein, the static transfer switch 106 maintains the connection with the first power source 102 and instead provides enough time and current for the circuit breaker 112 to clear a detected fault within environment 100. In embodiments, the controller 108 may obtain or receive, such as from a user, a preset or predefined peak current value and a preset RMS current or reference current value (reference current). The preset RMS current or reference current value may indicate a trip threshold value for the circuit breaker 112. In implementations where multiple downstream circuit breakers 112 are included in environment 100 or in communication with STS 106 and controller 108, the reference current may be obtained for the particular circuit breaker which has the largest trip threshold that corresponds to the shortest trip time. In embodiments, the circuit breaker 112 may transmit a digital signal to the controller 108 indicating its reference current. The controller 108 may obtain a sensed current value from the sensors 116 that corresponds to a current being provided by the first power source 102 to the load 114 via static transfer switch 106, transformer 110, and circuit breaker 112. The controller 108 may compare the preset peak current value to the sensed current value to determine a turn off time.

For example, if the sensed current value matches the preset peak current value the controller 108 may instruct the semiconductor switches 118 to turn off. At this point the current being provided downstream would be reduced to zero even though the first power source 102 is still providing voltage to the switch. The controller 108 can continue to integrate the preset RMS current until it matches the integration of the sensed current via the sensors 116 for determining when to turn on the semiconductor switches 118. Once the semiconductor switches 118 open, the sensed current drops to zero and the integration of the sensed current becomes flat at that point which is depicted below in FIG. 6 with reference to the flat portions of 604. For example, the controller 108 may determine an integrated value of the sensed current (updated sensed current subsequent to turning off the semiconductor switches 118) that is compared to an integrated value of the reference current value or preset RMS current. Once the integrated value of the sensed current matches the integrated value of the reference current value the controller 108 may instruct the semiconductor switches 118 to turn on. This cycle of turning off and turning on the semiconductor switches 118 can be repeated by the controller 108 and static transfer switch 106 until the circuit breaker 112 clears the detected fault for the environment 100 or when the reclosing period exceeds the maximum limit set in the controller 108. In embodiments, the controller 108 may also prevent a transfer from the first power source 102 to the second power source 104 while the downstream fault is still occurring (e.g, the circuit breaker 112 has not had enough time to clear the fault or incapable of clearing the fault) as this would result in endangering the second power source 104 after the transfer if the fault were still present in the system.

Figure 2:
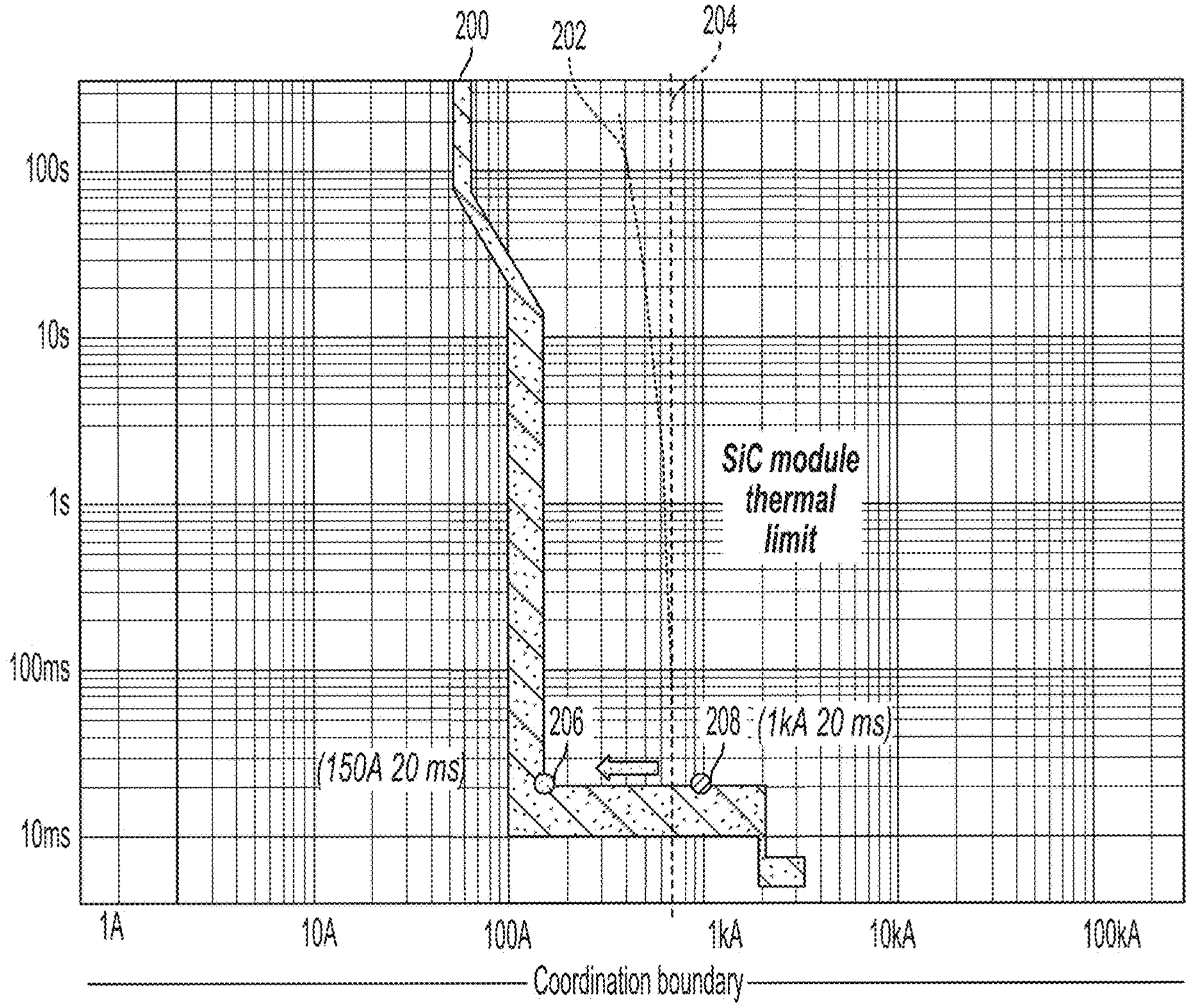
FIG. 2 depicts an example graph illustrating thermal limits of a STS and circuit breaker in accordance with one or more examples of the present disclosure.

FIG. 2 depicts an example graph illustrating thermal limits of a semiconductor switch inside a STS and circuit breaker in accordance with one or more examples of the present disclosure. As described above, a downstream circuit breaker of an electrical distribution system may trip based on its TCC, which is depicted in FIG. 2 as the shadowed black curve 200. As an example FIG. 2 also depicts the thermal limit of an associated semiconductor switch in a static transfer switch at 202. In an exemplary implementation the STS is a SiC STS module. The example graph of FIG. 2 depicts time on the y-axis and fault current in amperes (A) on the x-axis. The portion of the graph to the left of line 204 represents values of the graph where the STS and the circuit breaker coordinate well to clear a fault in the system. For example, if a fault current is 500 A the circuit breaker will trip at 20 milliseconds (ms) and the STS can withstand more than 10 seconds before turning of the switch connected to, for example, a first power source. However, conventional coordination between the STS and the circuit breaker does not work on the right part of the graph (e.g. to the right of line 204). For example, assume a fault current is 1 kA (represented at dot 208), in such a scenario the circuit breaker would need at least 20 ms to trip but at this current the STS cannot handle that much fault current for 1 ms let alone 20 ms. Some STSs are limited to handling a current less than 750 A. The reclosing function described in the present disclosure enables the STS to limit the fault current to a smaller value, such as 150 A represented at dot 206, which can be held for enough time (e.g. 20 ms) for the downstream circuit breaker to trip without endangering the STS and allowing for more system reliability.

Figure 3:
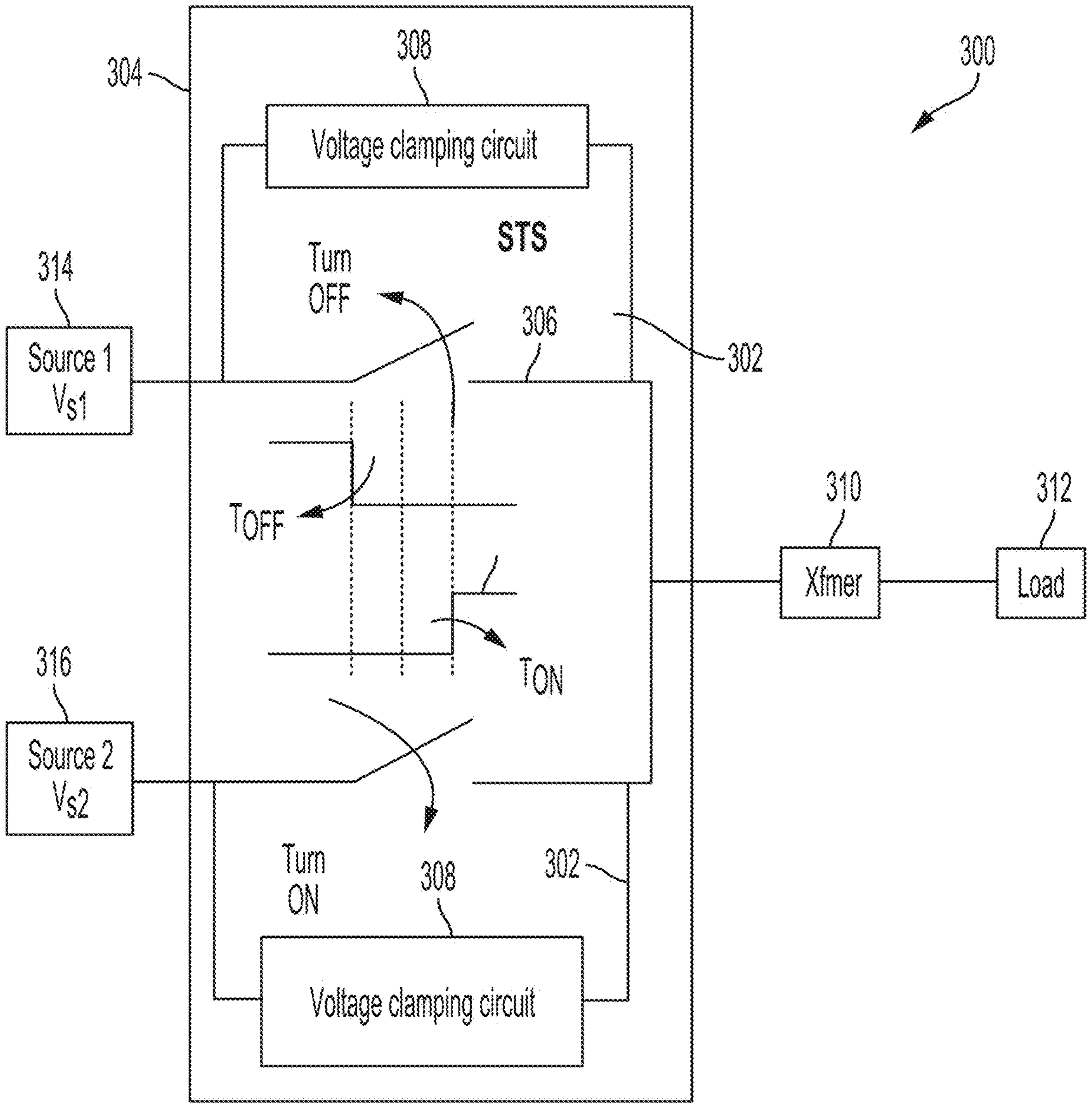
FIG. 3 depicts an exemplary switching cell of an STS that includes a Silicon Carbide (SiC) Metal-oxide-semiconductor field effect transistors (MOSFET)/module and a voltage clamping circuit as well as a transformer for providing a load in accordance with one or more examples of the present disclosure.

FIG. 3 depicts an exemplary environment 300 that includes a switching cell 302 of an STS 304 that includes a Silicon Carbide (SiC) Metal-oxide-semiconductor field effect transistors (MOSFET)/module 306 and a voltage clamping circuit 308 as well as a transformer 310 for providing a load 312 in accordance with one or more examples of the present disclosure. FIG. 3 also includes a first power source (Source 1) 314 and a second power source (Source 2) 316. The reclosing function features described in the present disclosure enable the controlling of the current distributed by the STS 304 to a specific value, that may be predefined or preset, and be based on the downstream circuit breaker trip curve. This can be achieved by determining appropriate turn on and turn off times for switching the SiC MOSFETs 306 connected to, for example, the first power source 314, to limit and control the RMS current flowing through the downstream circuit breaker. In the exemplary environment 300, each STS switching cell 302 includes a SiC MOSFET 306 and a voltage clamping circuit 308. The voltage clamping circuit 308 may clamp the voltage and dissipate the energy when the SiC MOSFET 306 turns off with an inductive load.

Figure 4:
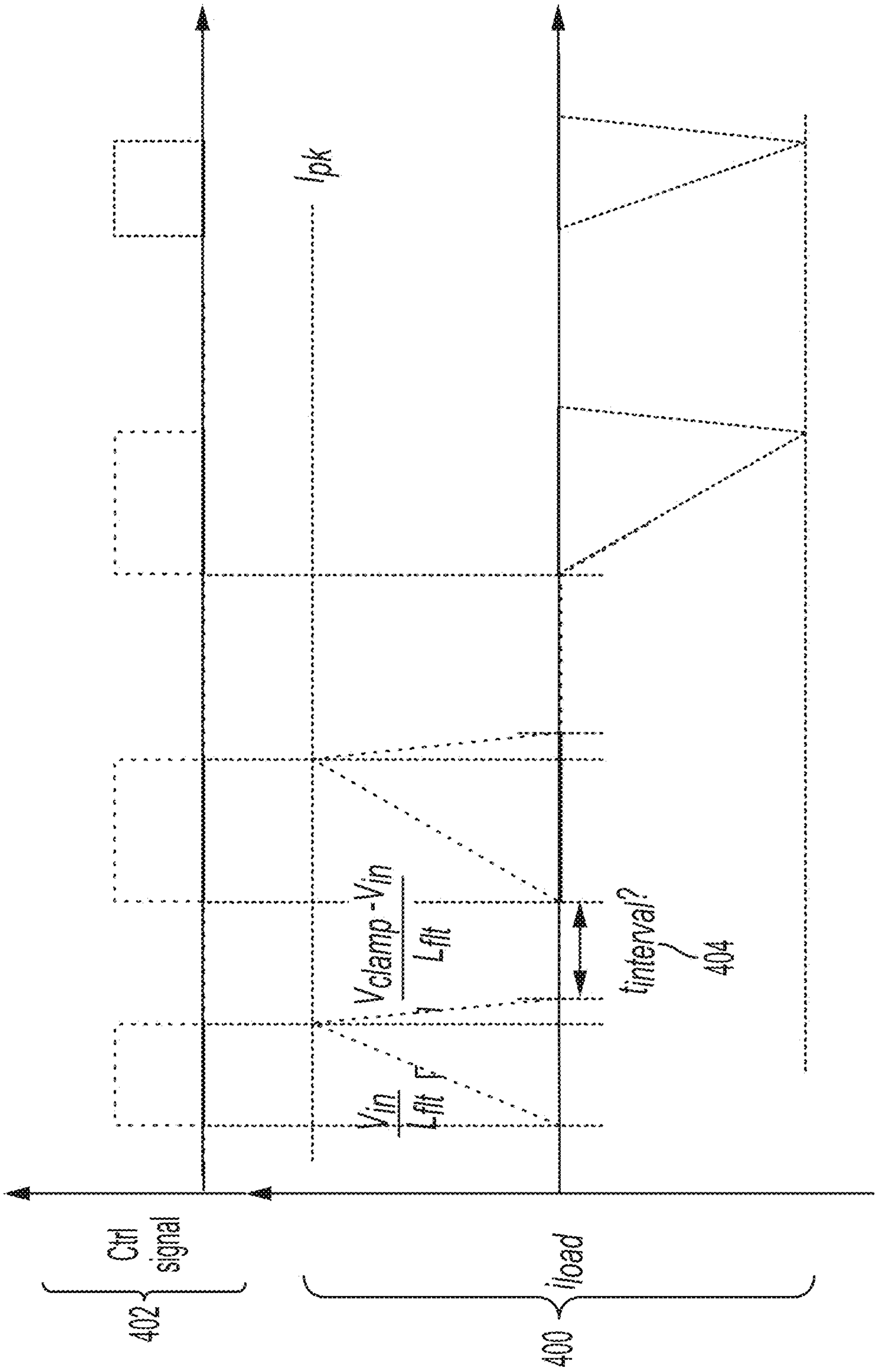
FIG. 4 depicts an example graph depicting waveforms of the inductance load ($i_{load}$) and control signal during conventional reclosing by an STS.

With reference to FIG. 4, the current waveform to the load is represented in FIG. 4 as $i_{load}$ 400. As is depicted in FIG. 4, when the SiC MOSFET 306 turns on, the current increases and the slope can be calculated by:

$$y_1 = \frac{V_{in}}{L_{flt}}. \tag{1}$$

FIG. 4 also depicts wave forms 402 which represent the control signals provided by the STS 304, or controller of the STS 304, to turn on and turn off the SiC MOSFET 306. As the SiC MOSFET 306 turns off, the current decreases, as depicted in FIG. 4, because the clamping voltage is higher than the input voltage. The slope of this current decrease can be calculated by:

$$y_2 = \frac{V_{clamp} - V_{in}}{L_{flt}}. \tag{2}$$

In equations (1) and (2) above and in FIG. 4, $V_{in}$ is the source voltage, $V_{clamp}$ is the clamping voltage of the voltage clamping circuit 308, and $L_{flt}$ is the fault inductance or fault current in the electrical distribution system. As depicted in FIG. 4, the controller of the STS 304 can determine an appropriate $t_{interval}$ 404 that corresponds to turn on and turn off times, and corresponding instructions/signals for the SiC MOSFETs, to control the RMS value of $i_{load}$ 400. This can include using a predefined or preset peak current value represented in FIG. 4 as $I_{pk}$. However, finding the correct turn on and turn off times for the reclosing function of the present disclosure can be difficult. For example, in an AC system, $V_{in}$ (the source voltage) can be different depending on the phase angle and the fault inductance $L_{flt}$ can be quite different depending on the fault location in the electrical distribution system. As such, it is not possible to pre-calculate or pre-compute an appropriate turn on and turn off time for the SiC MOSFET 306 that can keep the RMS current within a certain threshold that does not endanger the STS 304 but also allows the downstream circuit breaker to clear the fault or until a preset maximum duration is reached (e.g. 20 ms, 30 ms, etc.). The preset maximum duration may be specified by a user.

Figure 5:
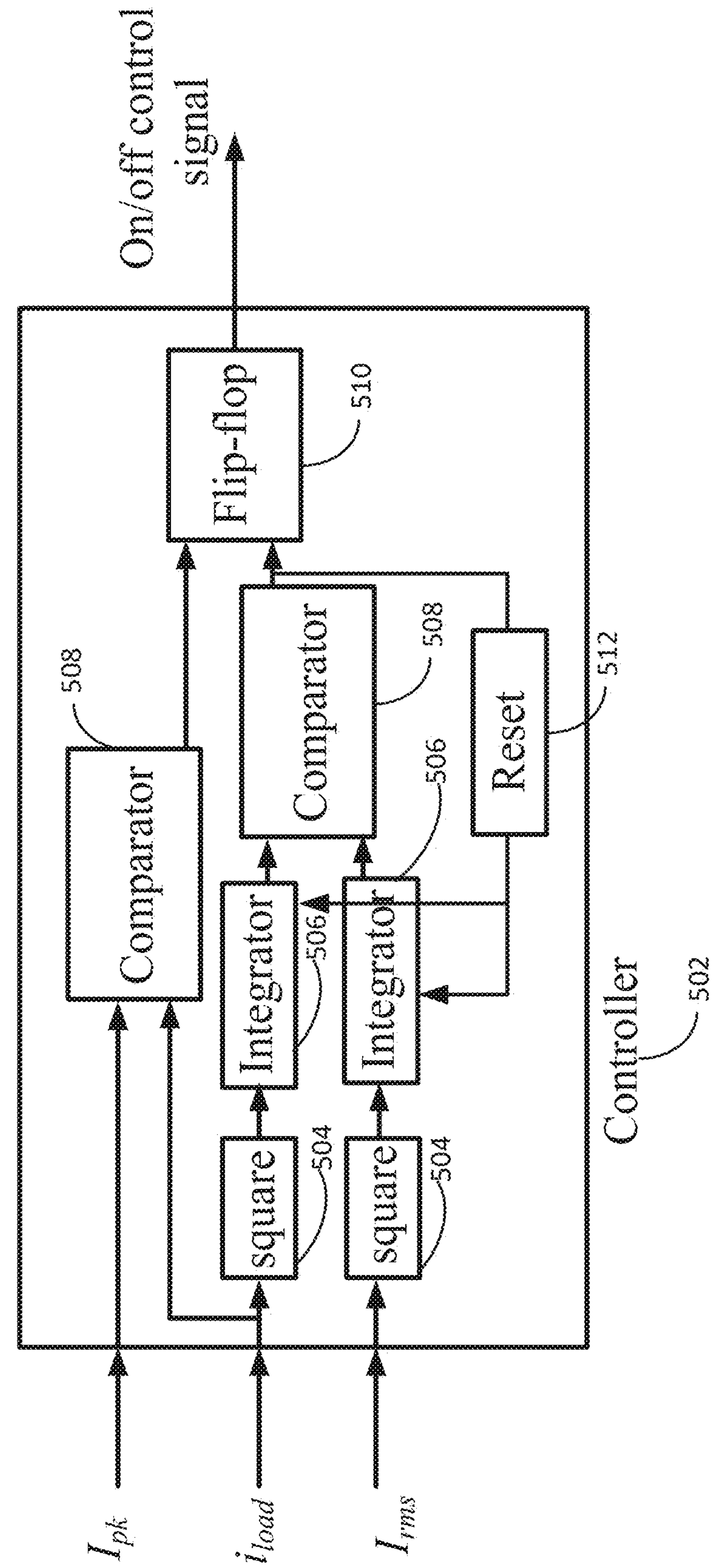
FIG. 5 depicts a simplified block diagram depicting an exemplary controller, inputs provided to the controller, components of the controller, and outputs of the controller for a reclosing function in accordance with one or more examples of the present disclosure.

FIG. 5 depicts a simplified block diagram depicting an exemplary environment 500 including an exemplary controller 502, inputs provided to the controller, components of the controller, and outputs of the controller for a reclosing function in accordance with one or more examples of the present disclosure. The reclosing function features described in the present disclosure include turning off the switch of an STS at a preset peak current and then calculating an RMS value of the sensed current to determine the next time instance to turn on the switch of the STS again. This cycle is repeated until the downstream circuit breaker clears the fault, or if the downstream circuit breaker is unable to clear the fault, the STS may turn off the switch and prohibit a transfer to a different power source until some other mechanism has cleared the fault in the electrical distribution system. However, it is not easy to calculate the real-time RMS current (e.g. RMS value) during operation of an STS. The reclosing function features of the present disclosure enable this by integrating the square of the sensed current value and comparing it with an integrated square of the reference current (reference value). For example, an initial goal of the reclosing function is to control the RMS current to be same as the reference value, as represented by:

$$I_{rms} = I_{ref}. \tag{3}$$

By squaring both does of the equation (3), the below equation can be derived:

$$\frac{\int_0^{t_i} |i_{load}|^2 dt}{t_i} = I_{ref}^2, \tag{4}$$

where $t_i$ is the instant time after the last turn on of the switch in the STS. To avoid the division in the calculation, both sides of equation (4) are multiplied by $t_i$ to that the below equation can be derived:

$$\int_0^{t_i} |i_{load}|^2 dt = I_{ref}^2 t_i. \tag{5}$$

In an exemplary embodiment, the reclosing function for coordination can include the load current $i_{load}$ of FIG. 5 being provided to controller 502. The load current $i_{load}$ can be sensed by sensors of the STS or by the controller itself 502. The load current $i_{load}$ is then provided to a multiplier component, represented by square 504, to calculate $|i_{load}|^2$. The $|i_{load}|^2$ is then provided to an integrator circuit 506 to determine $$\int_0^{t_i} |i_{load}|^2 dt.$$

FIG. 5 also depicts the provisioning or obtaining of $I_{pk}$ which represents the preset or predefined peak current value for the system. A comparator circuit 508 of the controller compares the load current (e.g. sensed current) $i_{load}$. Once the $i_{load}$ matches the $I_{pk}$ the comparator circuit 508 provides a reset signal to the flip-flop circuit 510 turn off an associated SiC MOSFET of an STS. In embodiments, the flip-flop circuit 510 of the controller 502 transmits the turn on and turn off instructions or signals for the SiC MOSFET of an associated STS to control the current in the electrical distribution system and allow enough time for a downstream circuit breaker to clear a fault in the system.

FIG. 5 also depicts the obtaining of $I_{rms}$ which may correspond to the reference current for the downstream circuit breaker. The $I_{rms}$ is also provided to a multiplier $$I_{ref}^2$$

which is then integrated over time to determine $$I_{ref}^2 t_i$$

by integrator circuit 506 of the controller 502. The two signals, $$\int_0^{t_i} |i_{load}|^2 dt$$

and $$I_{ref}^2 t_i$$

are then compared by comparator circuit 508 and once $$I_{ref}^2 t_i$$

increases to be the same as $$\int_0^{t_i} |i_{load}|^2 dt,$$

the output of the comparator circuit 508 flips from low to high to set the flip-flop circuit 510 to turn on the switch (SiC MOSFET) of the STS. As described above, the turn on and turn off control signals are determined by the controller 502 and allow the controller 502 of an STS to control the RMS current of a load to allow a downstream circuit breaker to trip and clear a fault of the load. In some embodiments, the controller 502 may not include the multiplier component 504 but instead may be configured to determine a rectified average value for the load current (e.g. sensed current) $i_{load}$ and the $I_{rms}$. In an embodiment, the controller 502 may be a microcontroller unit (MCU) configured to perform the processes described above with reference to FIG. 5 and the comparator circuit 508, multiplier component 504, integrator circuit 506, and flip-flop circuit 510. FIG. 5 also depicts 512, the integrated signal being reset when the device turns on to prepare for the integration and RMS calculation for next cycle.

Figure 6:
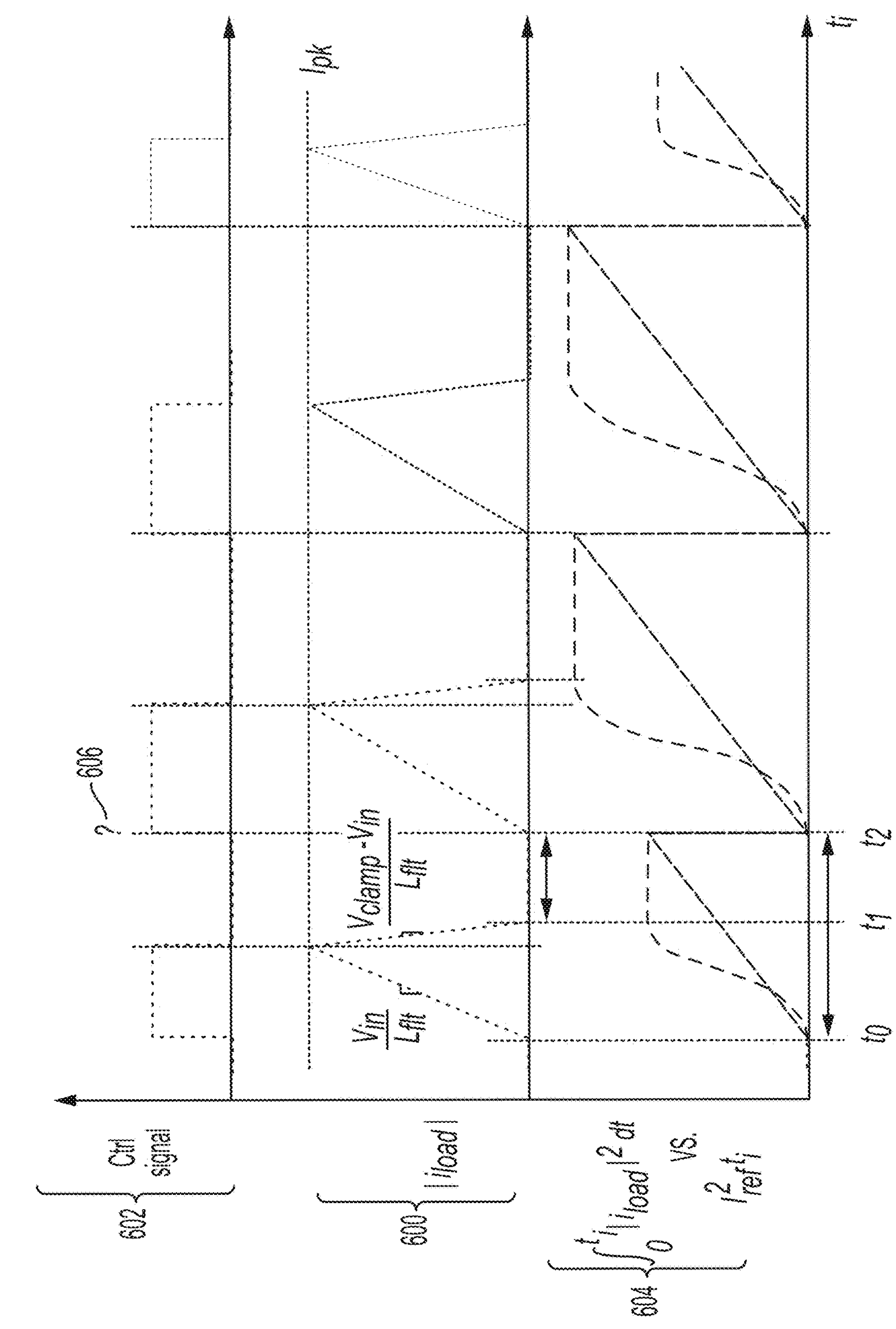
FIG. 6 depicts an example graph depicting waveforms of the inductance load ($i_{load}$), control signal, and comparison of integrated square of reference load to integrated square of sensed current during the reclosing function executed by an STS in accordance with one or more examples of the present disclosure.

FIG. 6 depicts an example graph depicting waveforms of the inductance load ($i_{load}$) 600 that are compared to a predefined or preset peak value or peak current value represented as $I_{pk}$, control signal 602, and comparison 604 of reference load to integrated sensed current during the reclosing function executed by an STS in accordance with one or more examples of the present disclosure. It should be noted that although FIG. 6 depicts waveforms associated with a single phase system, the embodiments described herein are not limited to single phase systems and the reclosing function features of the present disclosure may be applied in a three phase AC system. With reference to FIG. 5 and in an example scenario a fault may happen at $t_0$ and the load current starts to increase, represented in waveform 600. At $t_1$, when the current hits the preset peak current $I_{pk}$, the control signal 602 flips from high to low to turn off the SiC MOSFET of the STS. At this time instant, the integrated $$\int_0^{t_i} |i_{load}|^2 dt$$

of 604 is larger than $$I_{ref}^2 t_i$$

which means that the RMS current is higher than the desired current so the STS can wait a period of time to close to allow the current to increase again. At $t_2$ of 604 the $$I_{ref}^2 t_i$$

increases to match $$\int_0^{t_i} |i_{load}|^2 dt$$

which means that the RMS current is well controlled for this cycle and the control signal to turn on the SiC MOSFET of the STS can be provided to allow the current to increase again. And at t2 of 604, the integrated signal is reset when the device turns on to prepare for the integration and RMS calculation for next cycle. To apply the reclosing function features of the present disclosure system to a three-phase system, the control method described herein can be applied to all three phases with the same implementation as described above with reference to FIGS. 1, 2, 5, and 6. The "?" 606 of FIG. 6 represents the time instant for turning on the switches of the STS being unknown prior to the control features described herein by comparing the integrated $$\int_0^{t_i} |i_{load}|^2 dt$$

of 604 and $$I_{ref}^2 t_i$$

for controlling the RMS value.

Figure 7:
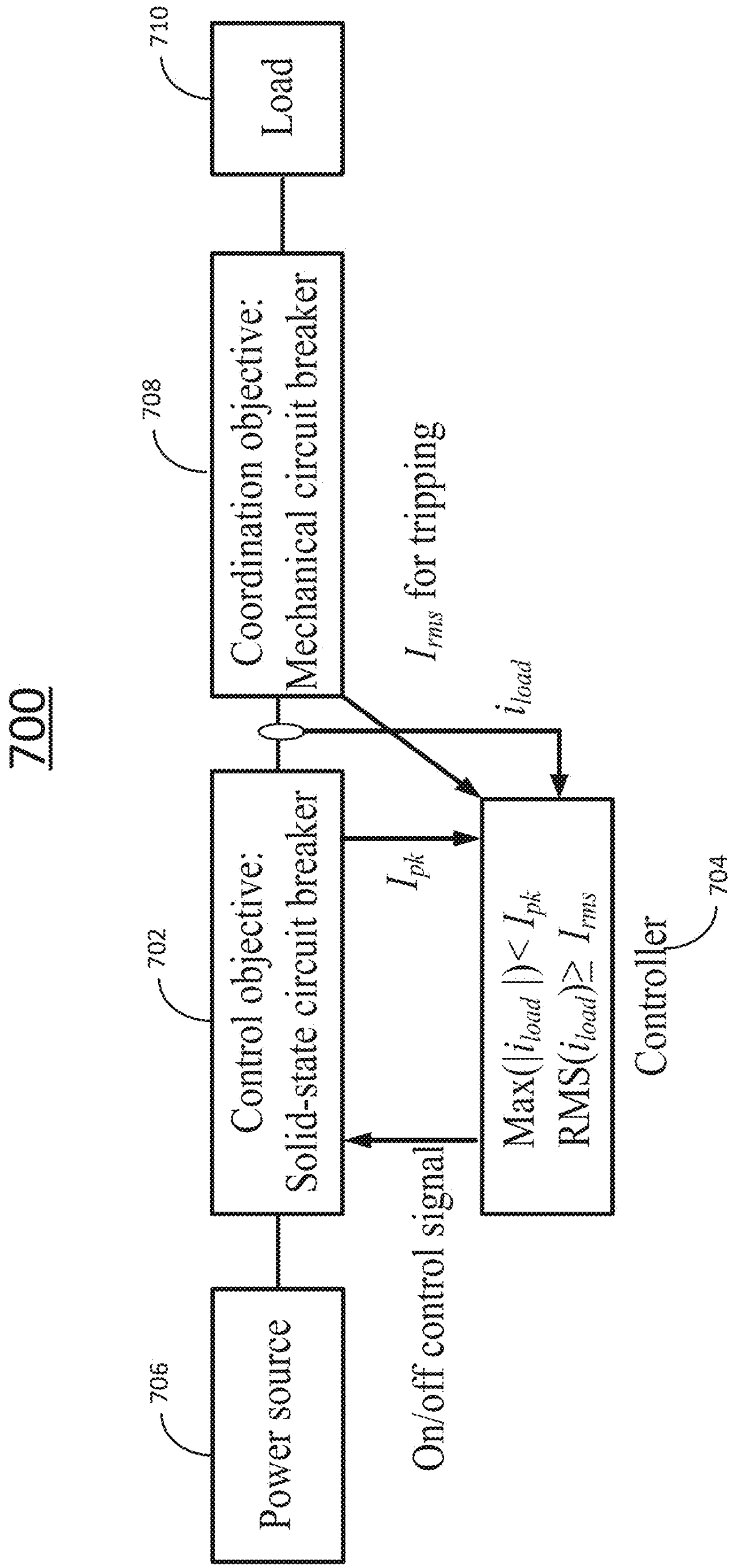
FIG. 7 depicts a simplified block diagram depicting an exemplary STS environment with a solid-state circuit breaker using a reclosing function in accordance with one or more examples of the present disclosure.

FIG. 7 depicts a simplified block diagram depicting an exemplary STS environment 700 with a solid-state circuit breaker 702 using a reclosing function in accordance with one or more examples of the present disclosure. In an exemplary embodiment, a controller 704 may be in communication with a solid-state circuit breaker 702. The solid-state circuit breaker 702 may be part of or a component of an STS or may be a standalone component in an electrical distribution system. The STS environment 700 includes a power source 706, a downstream mechanical circuit breaker 708, and load 710. The STS environment 700 may implement the reclosing function features described herein for controlling the RMS current within a certain range by providing turn on and turn off signals/instructions and appropriate times to the solid-state circuit breaker 702 to enable the mechanical circuit breaker (downstream circuit breaker) 708 to clear a detected fault. The STS environment 700 can compare the sensed current value $i_{load}$ to the peak current value $I_{pk}$ to determine a turn off time and provide, by the controller 704, the turn off signal to the solid-state circuit breaker 702, and compare the integrated values of the current to the integrated value of the reference current, represented as RMS $(i_{load}) \geq I_{rms}$ in FIG. 7, to determine a turn on time and provide the turn on signal to the solid-state circuit breaker 702. As described above with reference to FIGS. 1, 5, and 6, the controller 704 can implement similar functions to control the RMS current within a certain range to enable the mechanical circuit breaker 708 to trip and clear a detected fault or until a preset maximum duration is reached. The solid-state circuit breaker 702 may include one or more semiconductor devices which turn on and off based on instructions or signals from the controller 704.

Figure 8:
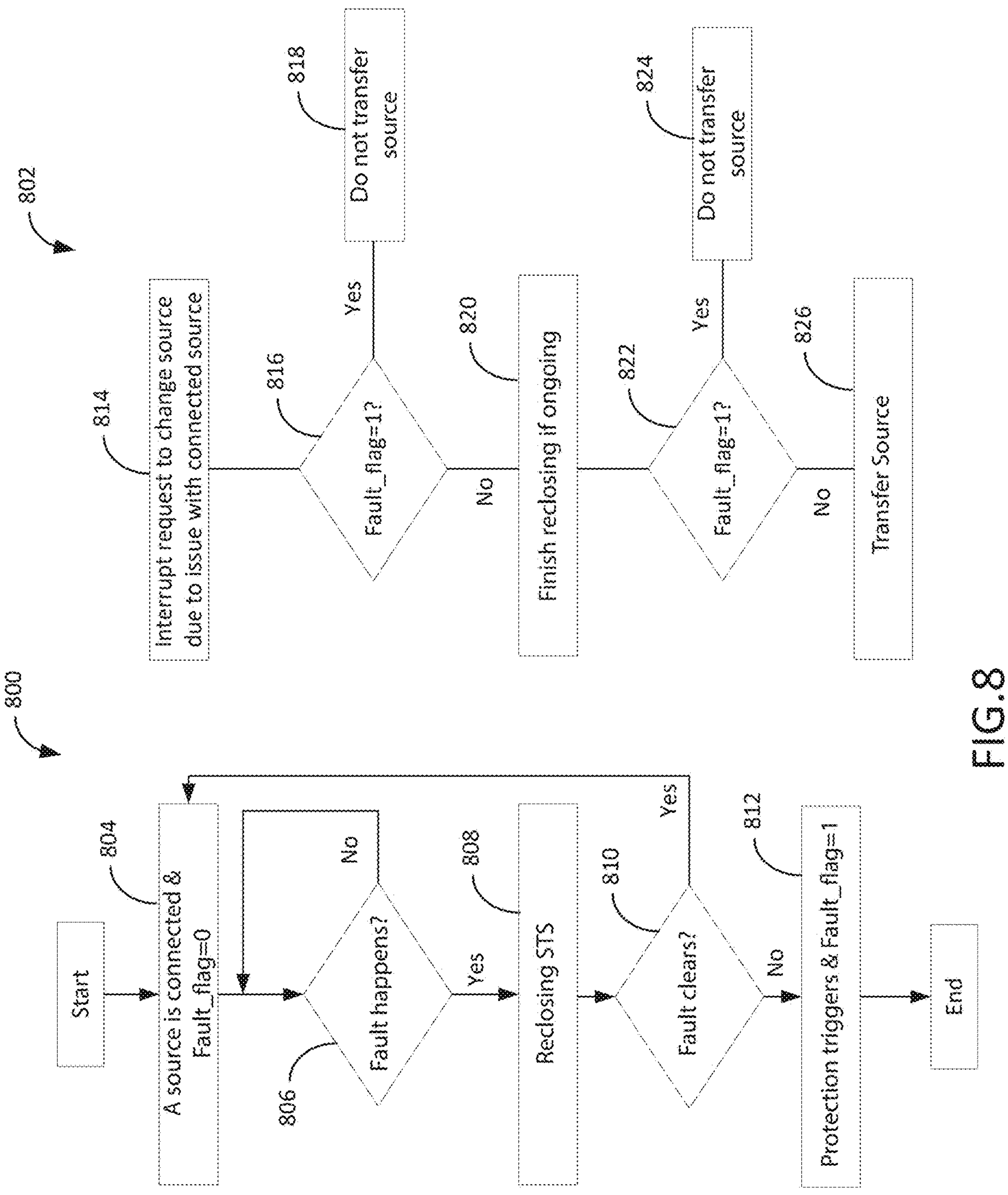
FIG. 8 depicts exemplary flowcharts for a reclosing function and interrupting a transfer request between power sources by the STS based on the operation of the reclosing function in accordance with one or more examples of the present disclosure.

FIG. 8 depicts exemplary flowcharts for a reclosing function 800 and interrupting a transfer request 802 between power sources by the STS based on the operation of the reclosing function in accordance with one or more examples of the present disclosure. In flowchart 800, the process includes identifying that a source, such as a first power source, is connected to the STS and the controller for the STS sets a Fault_flag to zero at 804. The process 800 continues at 806 by determining if a fault has occurred in the electrical distribution system. If a fault is not detected the controller and STS continue to monitor data, electrical measurements, or measurements from the sensors of the STS to identify if a fault is occurring in the system. However, if a fault is identified at 806, the process continues at 808 by executing the reclosing function described herein. The process 800 continues by identifying whether the downstream circuit breaker of the system has been able to clear the fault at 810. If the controller determines that the downstream circuit breaker has cleared the fault then the process returns to 804 by continuing the be connected to the same power source (first power source) and maintaining the Fault_flag to zero.

If, at 810, the controller determines that the fault has not cleared after executing one or more reclosing function cycles, the process includes at 812 the controller updating the Fault_flag to one and ending the process. At 812 the controller mat execute the protection triggers of the STS to ensure that the integrity of the STS and the power sources are not compromised by the fault. Flowchart 802 represents a concurrent process that is executed by the controller and ensures that requests to transfer power from the first power source to the second power source are interrupted when the fault in the system has not been cleared. For example, if the fault is not cleared, as indicated at 812, the STS updates the Fault_flag to one and the STS remains connected to the first power source. If at the same time there is some issue with the first power source, which can occur due to the fault in the system, such as the voltage being pulled down), an interrupt request is received by the controller (as part of the reclosing function), the controller will finish the reclosing operation. Flowchart 802 represents a control implemented by the controller that will only transfer to the second power source (an alternative power source) once the fault is cleared.

For example, once the controller receives a transfer command it will first detect or determine whether the fault has already been cleared in the system by checking the Fault_flag setting. If the Fault_flag is set to one, indicating the fault has not been cleared, the controller will not execute or will prohibit the transfer of power from the first power source to the second power source by the STS. To continue the scenario, if there are no faults in the system (e.g, the Fault_flag is set to zero), the controller would await a reclosing function execution to finish and then check to see if the fault in the system were cleared before deciding whether to execute a transfer request between power sources. Put another way, the flowchart 802 of FIG. 8 represents the controller only allowing a transfer action by the STS between power sources when there are no load side faults in the system. The flowchart 802 includes at 814 interrupting, by the controller, a request to change power sources due to issues with a connected power source, such as issues with a first power source. At 816 the controller checks whether the Fault_flag is set to one or zero. If the Fault_flag is set to one, indicating that a fault still exists on the load side, the controller will not execute a transfer source action at 818. The flowchart 802 includes, at 820, the controller awaiting a reclosing function execution to finish if the Fault_flag is set to zero at 816. After the reclosing function is finished at 820, the controller checks the status of the Fault_flag at 822. As depicted in flowchart 802, if the Fault_flag is set to one indicating that the fault on the load side has not been cleared—the controller will not execute a transfer between power sources by the STS at 824. If the determination at 822 results in the Fault_flag being set to zero then the controller will execute the transfer source command between power sources at 826.

Figure 9:
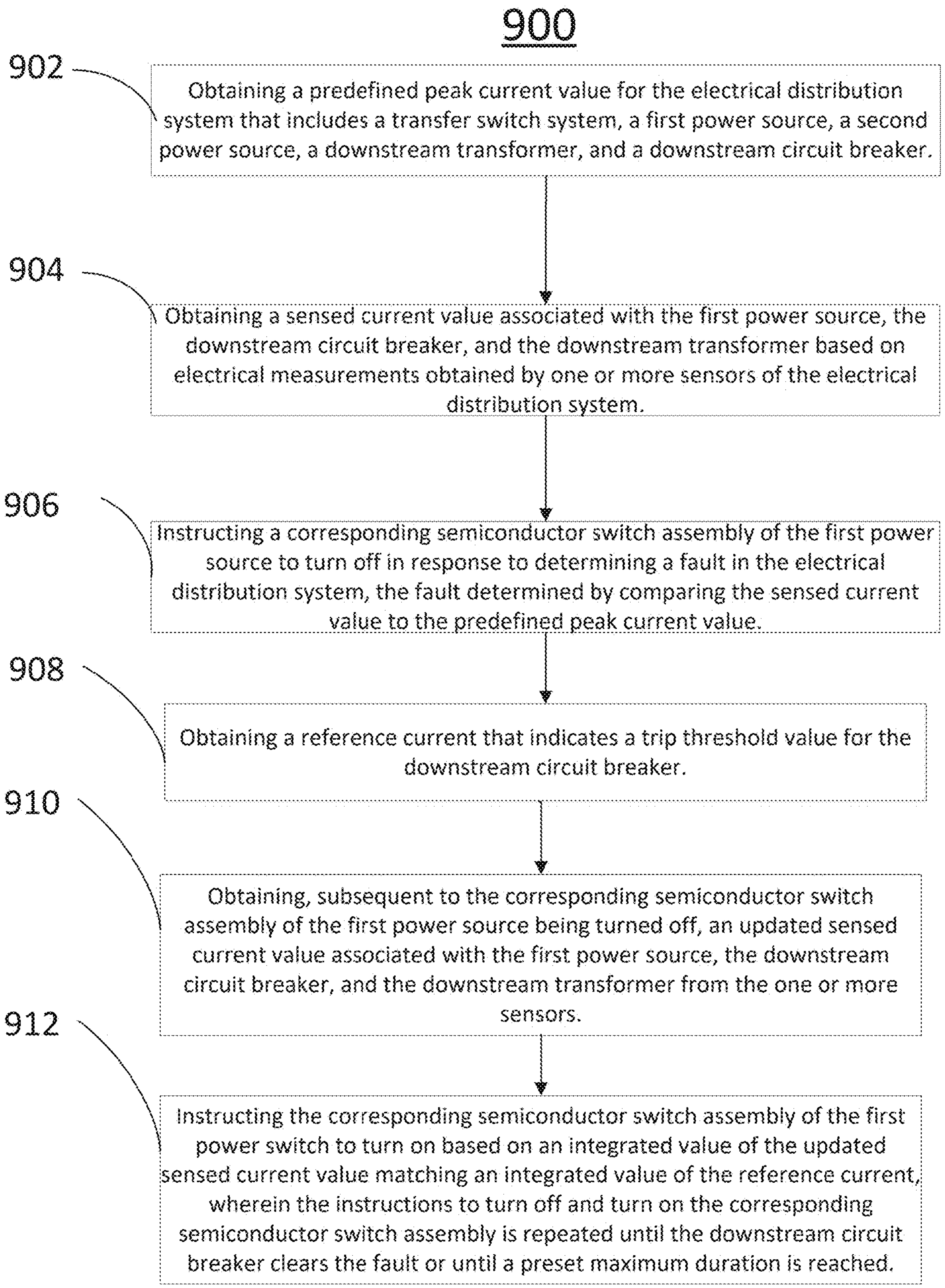
FIG. 9 depicts an example flowchart for reclosing function features in accordance with one or more examples of the present disclosure.

FIG. 9 depicts an example flowchart for reclosing function features in accordance with one or more examples of the present disclosure. FIG. 9 includes an exemplary process 900 which may be performed by an environment or architecture such as in FIGS. 1, 3, 5, and 7 for methods or features disclosed herein and by systems and components of FIGS. 1, 3, 5, and 7. However, it will be recognized that any of the following blocks may be performed in any suitable order and that the process 900 may be performed in any environment or architecture and by any suitable computing device and/or controller.

At step 902, the process 900 includes obtaining a predefined peak current value for the electrical distribution system that includes a transfer switch system, a first power source, a second power source, a downstream transformer, and a downstream circuit breaker.

At step 904, the process 900 includes obtaining a sensed current value associated with the first power source, the downstream circuit breaker, and the downstream transformer based on electrical measurements obtained by one or more sensors of the electrical distribution system.

At step 906, the process 900 includes Instructing a corresponding semiconductor switch assembly of the first power source to turn off in response to determining a fault in the electrical distribution system, the fault determined by comparing the sensed current value to the predefined peak current value.

At step 908, the process 900 includes obtaining a reference current that indicates a trip threshold value for the downstream circuit breaker.

At step 910, the process 900 includes obtaining, subsequent to the corresponding semiconductor switch assembly of the first power source being turned off, an updated sensed current value associated with the first power source, the downstream circuit breaker, and the downstream transformer from the one or more sensors.

At step 912, the process 900 includes instructing the corresponding semiconductor switch assembly of the first power switch to turn on based on an integrated value of the updated sensed current value matching an integrated value of the reference current, wherein the instructions to turn off and turn on the corresponding semiconductor switch assembly is repeated until the downstream circuit breaker clears the fault or until a preset maximum duration is reached. In embodiments, the controller can obtain the sensed current of the electrical distribution system via an associated shunt resistor of the STS that it compares with a voltage threshold maintained by the controller. In embodiments, the controller can determine the RMS calculation described above using a bimetallic strip that heats up in proportion to the $I^2t$ calculation and interrupts a circuit that controls the semiconductor switching device of the STS.

Figure 10:
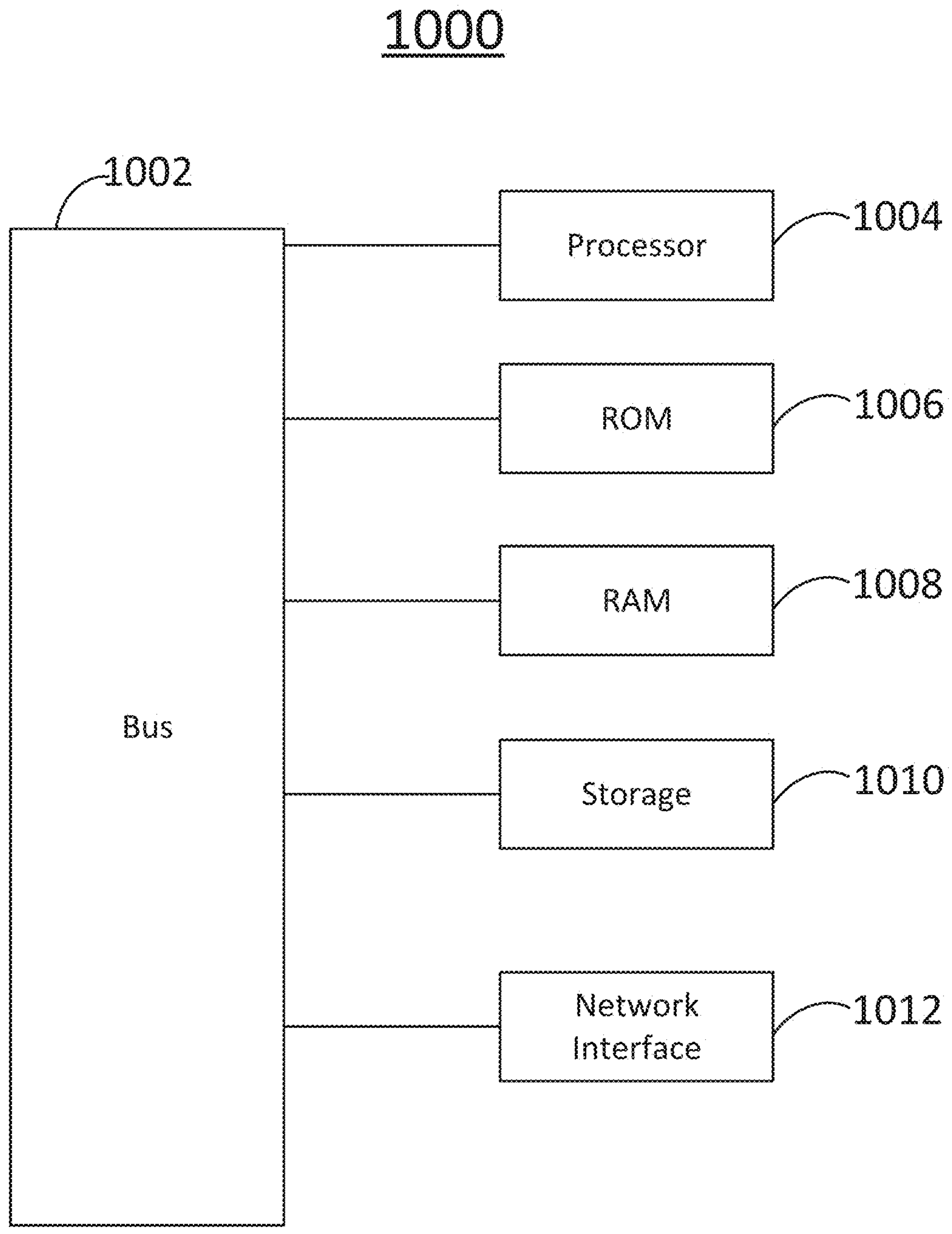
FIG. 10 is a simplified block diagram of one or more devices or systems within the exemplary environment of FIGS. 1, 3, 5, and 7.

FIG. 10 is a block diagram of an exemplary system or device 1000 within the environment 100, 300, 500, and/or 700 such as the controller 108, 502, and/or 704. The system 1000 includes a processor 1004, such as a central processing unit (CPU), and/or logic, that executes computer executable instructions for performing the functions, processes, and/or methods described herein. In some examples, the computer executable instructions are locally stored and accessed from a non-transitory computer readable medium, such as storage 1010, which may be a hard drive or flash drive. Read Only Memory (ROM) 1006 includes computer executable instructions for initializing the processor 1004, while the random-access memory (RAM) 1008 is the main memory for loading and processing instructions executed by the processor 1004. The network interface 1012 may connect to a wired network or cellular network and to a local area network or wide area network. The system 1000 may also include a bus 1002 that connects the processor 1004, ROM 1006, RAM 1008, storage 1010, and/or the network interface 1012. The components within the system 1000 may use the bus 1002 to communicate with each other. The components within the system 1000 are merely exemplary and might not be inclusive of every component within the controller 108, 502, and/or 704. Additionally, and/or alternatively, the system 1000 may further include components that might not be included within every entity of environment 100, 300, 500, and 700. For instance, in some examples, the controller 100 might not include a network interface 1012.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A transfer switch system for controlling current to a downstream circuit breaker of an electrical distribution system, the transfer switch system comprising:

a first power source and a second power source;

one or more sensors configured to detect an electrical measurement associated with powering a load between the first power source, the second power source, a downstream transformer, and the downstream circuit breaker;

one or more semiconductor switch assemblies, the first power source and the second power source associated with a different semiconductor switch assembly of the one or more semiconductor switch assemblies; and a controller configured to:

obtain a predefined peak current value;

obtain a sensed current value associated with the first power source, the downstream circuit breaker, and the downstream transformer based on electrical measurements obtained by the one or more sensors;

instruct a corresponding semiconductor switch assembly of the first power source to turn off in response to determining a fault in the electrical distribution system, the fault determined by comparing the sensed current value to the predefined peak current value;

obtain a reference current that indicates a trip threshold value for the downstream circuit breaker;

obtain, subsequent to the corresponding semiconductor switch assembly of the first power source being turned off, an updated sensed current value associated with the first power source, the downstream circuit breaker, and the downstream transformer from the one or more sensors; and instruct the corresponding semiconductor switch assembly of the first power source to turn on based on an integrated value of the updated sensed current value matching an integrated value of the reference current, wherein the instructions to turn off and turn on the corresponding semiconductor switch assembly is repeated until the downstream circuit breaker clears the fault or until a preset maximum duration is reached.

2. The transfer switch system according to claim 1, wherein the one or more semiconductor switch assemblies comprise at least one of silicon controlled rectifiers (SCRs), insulate gate bipolar transistors (IGBTs), metal-oxide-semiconductors (MOSFETs), integrated gate-commutated thyristors (IGCTs), and gate turn-off thyristors (GTOs).

3. The transfer switch system according to claim 1, wherein each switch of the one or more semiconductor switch assemblies is associated with a different phase of an A/C current of the load, and wherein the controller is further configured to obtain the predefined peak current value for each phase of the A/C current, the sensed current value for each phase of the A/C current, and wherein instructing the corresponding semiconductor switch assembly of the first power source to turn on and turn off includes switching a corresponding switch of the corresponding semiconductor switch assembly for a certain phase of the A/C current.

4. The transfer switch system according to claim 1, wherein the predefined peak current value and the reference current are user specified, or wherein the reference current is based on a digital signal provided by the downstream circuit breaker indicating the trip threshold.

5. The transfer switch system according to claim 1, wherein the reference current is based on characteristics of the downstream circuit breaker.

6. The transfer switch system according to claim 1, wherein the controller further comprises:

a comparator circuit;

a multiplier component;

an integrator circuit with a reset function; and a flip-flop circuit.

7. The transfer switch system according to claim 6, wherein the integrated value of the updated sensed current value and the integrated value of the reference current are determined by providing the updated sensed current value and the reference current to the multiplier component and the integrator circuit as input.

8. The transfer switch system according to claim 7, wherein the matching of the integrated value of the updated sensed current value, or a square of the updated sensed current value, or a function of the updated current sense value to the integrated value of the reference current, or a square of the reference current, or a function of the reference current is implemented by the comparator circuit.

9. The transfer system according to claim 8, wherein the instructions to turn off and turn on the corresponding semiconductor switch assembly are further based at least in part on the flip-flop circuit receiving an output from the comparator circuit.

10. The transfer system according to claim 1, wherein the controller is further configured to initiate a connection between the second power source and the load in response to a transfer command by instructing each switch of the corresponding semiconductor switch assembly of the first power source to turn off in response to a fault flag being cleared by the controller, wherein the fault flag is cleared in response to the downstream circuit breaker clearing the fault, and instructing each switch of a corresponding semiconductor switch assembly of the second power source to turn on.

11. The transfer system according to claim 10, wherein initiating the connection between the second power source and the load is prohibited by the controller based on at least one iteration of the instructing of the corresponding semiconductor switch assembly of the first power source to turn off and turn on, or based on the fault flag being set by the controller, wherein the fault flag is set in response to the downstream circuit breaker failing to clear the fault.

12. A tangible, non-transitory computer-readable medium having instructions thereon which, upon being executed by one or more processors, provide for controlling current to a downstream circuit breaker of an electrical distribution system by execution of the following steps:

obtaining a predefined peak current value for the electrical distribution system that includes a transfer switch system, a first power source, a second power source, a downstream transformer, and a downstream circuit breaker;

obtaining a sensed current value associated with the first power source, the downstream circuit breaker, and the downstream transformer based on electrical measurements obtained by one or more sensors of the electrical distribution system;

instructing a corresponding semiconductor switch assembly of the first power source to turn off in response to determining a fault in the electrical distribution system, the fault determined by comparing the sensed current value to the predefined peak current value;

obtaining a reference current that indicates a trip threshold value for the downstream circuit breaker;

obtaining, subsequent to the corresponding semiconductor switch assembly of the first power source being turned off, an updated sensed current value associated with the first power source, the downstream circuit breaker, and the downstream transformer from the one or more sensors; and instructing the corresponding semiconductor switch assembly of the first power switch to turn on based on an integrated value of the updated sensed current value matching an integrated value of the reference current, wherein the instructions to turn off and turn on the corresponding semiconductor switch assembly is repeated until the downstream circuit breaker clears the fault or until a preset maximum duration is reached.

13. The tangible, non-transitory computer-readable medium according to claim 12, wherein each switch of the one or more semiconductor switch assemblies is associated with a different phase of an A/C current of the load, and wherein the instructions, upon being executed by the one or more processors, are further configured to execute the following steps:

obtaining the predefined peak current value for each phase of the A/C current, the sensed current value for each phase of the A/C current, and wherein instructing the corresponding semiconductor switch assembly of the first power source to turn on and turn off includes switching a corresponding switch of the corresponding semiconductor switch assembly for a certain phase of the A/C current.

14. The tangible, non-transitory computer-readable medium according to claim 12, wherein the predefined peak current value and the reference current are user specified, or wherein the reference current is based on a digital signal provided by the downstream circuit breaker indicating the trip threshold.

15. The tangible, non-transitory computer-readable medium according to claim 12, wherein the reference current is based on characteristics of the downstream circuit breaker.

16. The tangible, non-transitory computer-readable medium according to claim 12, wherein the electrical distribution system further comprises a microcontroller unit (MCU).

17. The tangible, non-transitory computer-readable medium according to claim 16, wherein the integrated value of the updated sensed current value and the integrated value of the reference current are determined by providing the updated sensed current value and the reference current to the MCU as input.

18. The tangible, non-transitory computer-readable medium according to claim 16, wherein the matching of the integrated value of the updated sensed current value to the integrated value of the reference current is implemented by the MCU.

19. The tangible, non-transitory computer-readable medium according to claim 18, wherein the instructions to turn off and turn on the corresponding semiconductor switch assembly are further based at least in part on receiving an output from the MCU.

20. A solid-state circuit breaker for controlling current to a downstream mechanical circuit breaker of an electrical distribution system, the solid-state circuit breaker comprising:

one or more sensors configured to detect electrical measurements associated with powering a load between a power source and the downstream mechanical circuit breaker;

one or more semiconductor devices; and a controller configured to:

obtain a predefined peak current value;

obtain a sensed current value associated with the power source and the downstream mechanical circuit breaker based on the electrical measurements obtained by the one or more sensors;

instruct a corresponding semiconductor device of the solid-state circuit breaker to turn off in response to determining a fault in the electrical distribution system, the fault determined by comparing the sensed current value to the predefined peak current value;

obtain a reference current that indicates a trip threshold value for the downstream mechanical circuit breaker;

obtain, subsequent to the corresponding semiconductor device of the solid-state circuit breaker being turned off, an updated sensed current value associated with the power source and the downstream mechanical circuit breaker from the one or more sensors; and instruct the corresponding semiconductor device of the solid-state circuit breaker to turn on based on an integrated value of the updated sensed current value matching an integrated value of the reference current, wherein the instructions to turn off and turn on the corresponding semiconductor device are repeated until the downstream circuit breaker clears the fault or until a preset maximum duration is reached.

* * * * *